United States Patent
Pyeon et al.

(10) Patent No.: US 11,855,491 B2
(45) Date of Patent: Dec. 26, 2023

(54) MOTOR

(71) Applicant: LG INNOTEK CO., LTD., Seoul (KR)

(72) Inventors: Jin Su Pyeon, Seoul (KR); Tae Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/639,772

(22) PCT Filed: Aug. 26, 2020

(86) PCT No.: PCT/KR2020/011366
§ 371 (c)(1),
(2) Date: Mar. 2, 2022

(87) PCT Pub. No.: WO2021/045432
PCT Pub. Date: Mar. 11, 2021

(65) Prior Publication Data
US 2022/0337110 A1 Oct. 20, 2022

(30) Foreign Application Priority Data
Sep. 3, 2019 (KR) .................. 10-2019-0108914

(51) Int. Cl.
*H02K 1/00* (2006.01)
*H02K 1/2781* (2022.01)
*H02K 1/14* (2006.01)

(52) U.S. Cl.
CPC .............. *H02K 1/2781* (2022.01); *H02K 1/14* (2013.01); *H02K 2213/03* (2013.01)

(58) Field of Classification Search
CPC .... H02K 1/2781; H02K 1/14; H02K 2213/03; H02K 21/16; H02K 1/278; H02K 21/22
See application file for complete search history.

(56) References Cited

U.S. PATENT DOCUMENTS

| | | | |
|---|---|---|---|
| 6,657,350 B2 * | 12/2003 | Kimura | H02K 1/276 310/156.53 |
| 9,641,031 B2 * | 5/2017 | Bouarroudj | H02K 1/2706 |
| 9,698,636 B2 * | 7/2017 | Matsuoka | H02K 1/2773 |
| 2013/0249502 A1 | 9/2013 | Ritchey | |

(Continued)

FOREIGN PATENT DOCUMENTS

| JP | 2008295179 A | * 12/2008 |
|---|---|---|
| KR | 20150132578 A | * 11/2015 |

(Continued)

*Primary Examiner* — Quyen P Leung
*Assistant Examiner* — Elrasheed E. B. Hamdan
(74) *Attorney, Agent, or Firm* — Birch, Stewart, Kolasch & Birch, LLP

(57) ABSTRACT

The present invention may provide a motor including a rotor and a stator disposed to correspond to the rotor, wherein the rotor includes a rotor core and a magnet disposed on the rotor core, a tooth of the stator includes a first surface facing the magnet, the magnet includes a second surface in contact with the rotor core and a third surface which is spaced apart from the second surface and faces the first surface, the third surface includes a flat surface, and a first length which is a shortest distance of the flat surface is in the range of 46% to 50% of a second length of a shortest distance of the first surface.

16 Claims, 13 Drawing Sheets

(56) References Cited

U.S. PATENT DOCUMENTS

2018/0316230 A1    11/2018  Benjack et al.
2020/0274406 A1 *   8/2020  Uchimura .............. H02K 1/276

FOREIGN PATENT DOCUMENTS

| KR | 10-2018-0048212 A | | 5/2018 |
|----|----|----|----|
| KR | 101891002 B1 | * | 5/2018 |
| KR | 10-2018-0121349 A | | 11/2018 |
| KR | 10-2018-0138445 A | | 12/2018 |
| KR | 20180138445 A | * | 12/2018 |
| KR | 10-2019-0023244 A | | 3/2019 |
| KR | 20190023244 A | * | 3/2019 |
| WO | WO 2014115436 A1 | * | 1/2017 |
| WO | WO 2017/183656 A1 | | 10/2017 |

\* cited by examiner

[FIG. 1]
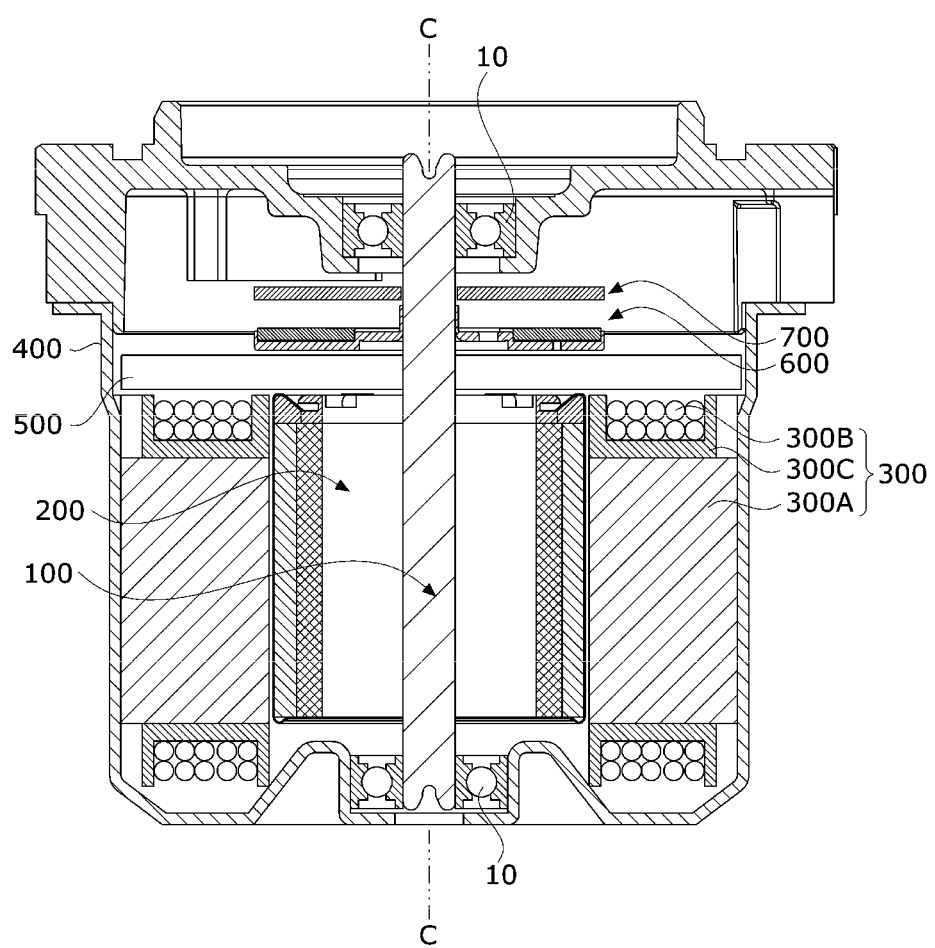

[FIG. 2]
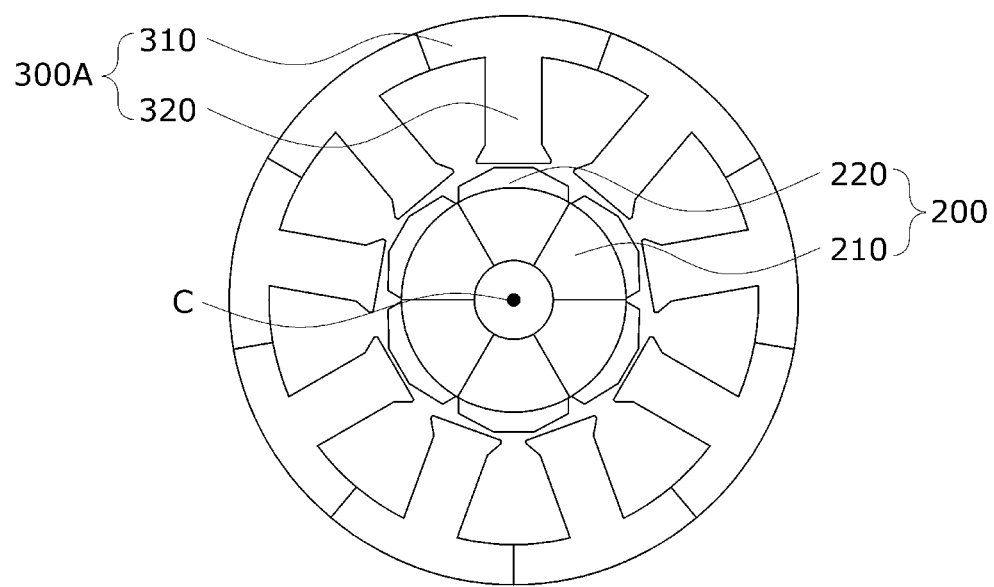

[FIG. 3]
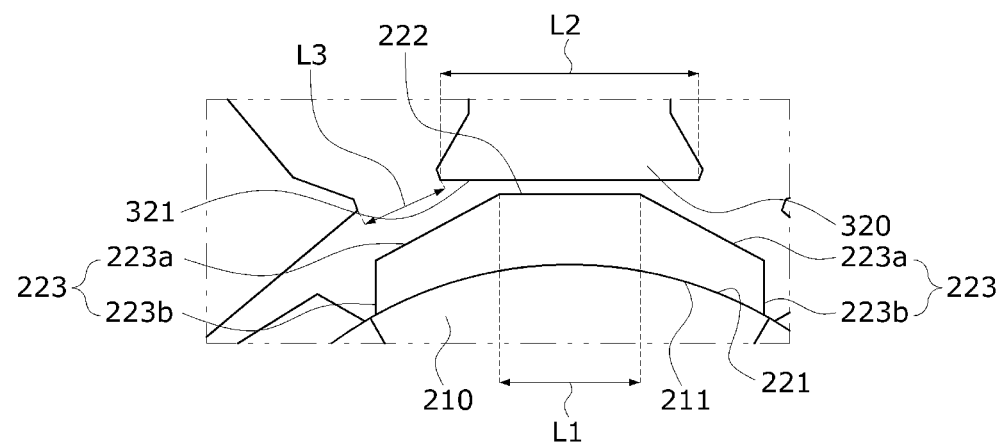

[FIG. 4]
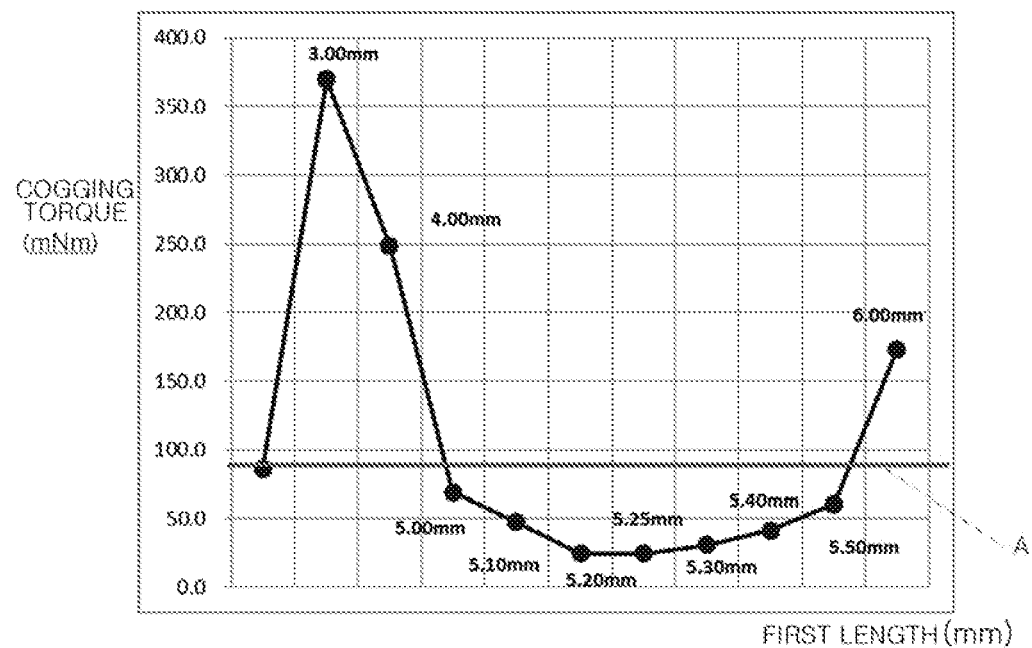

[FIG. 5]

| FIRST LENGTH (L1) | COGGING TORQUE | CHANGE RATIO OF COGGING TORQUE COMPARED TO COMPARATIVE EXAMPLE | TORQUE | CHANGE RATIO OF TORQUE COMPARED TO COMPARATIVE EXAMPLE |
|---|---|---|---|---|
| COMPARATIVE EXAMPLE(A) | 86.4 | - | 5.39 | - |
| ① 3.00mm | 369.5 | 327% ↑ | 4.96 | 0.50% ↓ |
| ② 4.00mm | 249.3 | 188% ↑ | 5.13 | 0.30% ↓ |
| ③ 5.00mm | 69.1 | 20% ↓ | 5.29 | 0.11% ↓ |
| ④ 5.10mm | 47.5 | 45% ↓ | 5.31 | 0.10% ↓ |
| ⑤ 5.20mm | 24.7 | 71% ↓ | 5.33 | 0.08% ↓ |
| ⑥ 5.25mm | 24.5 | 72% ↓ | 5.33 | 0.08% ↓ |
| ⑦ 5.30mm | 30.8 | 64% ↓ | 5.34 | 0.06% ↓ |
| ⑧ 5.40mm | 41.5 | 52% ↓ | 5.36 | 0.04% ↓ |
| ⑨ 5.50mm | 60.6 | 30% ↓ | 5.37 | 0.02% ↓ |
| ⑩ 6.00mm | 173.4 | 100% ↑ | 5.45 | 0.07% ↑ |

[FIG. 6]
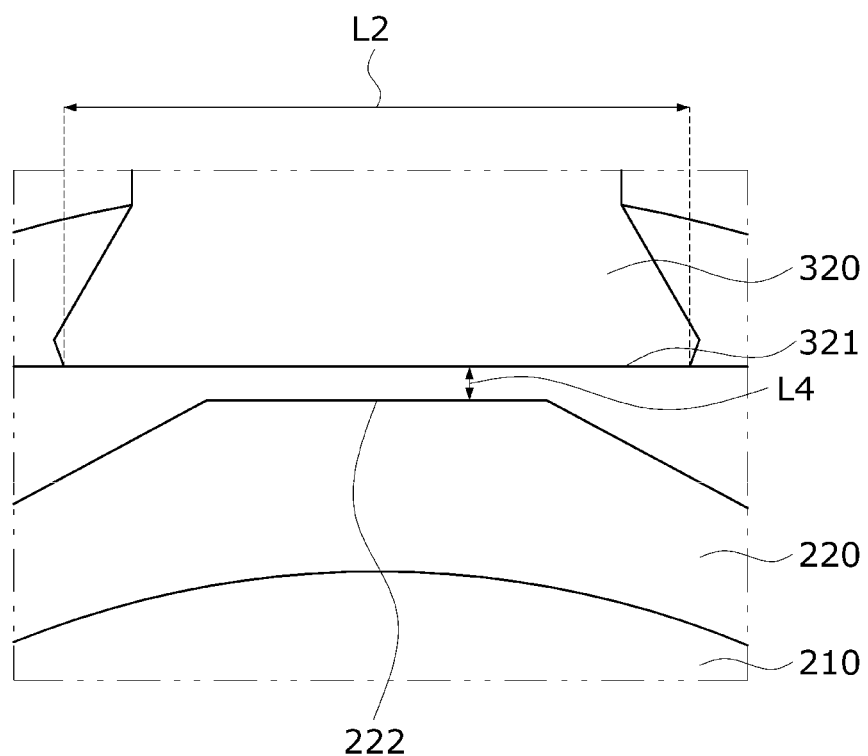

[FIG. 7]
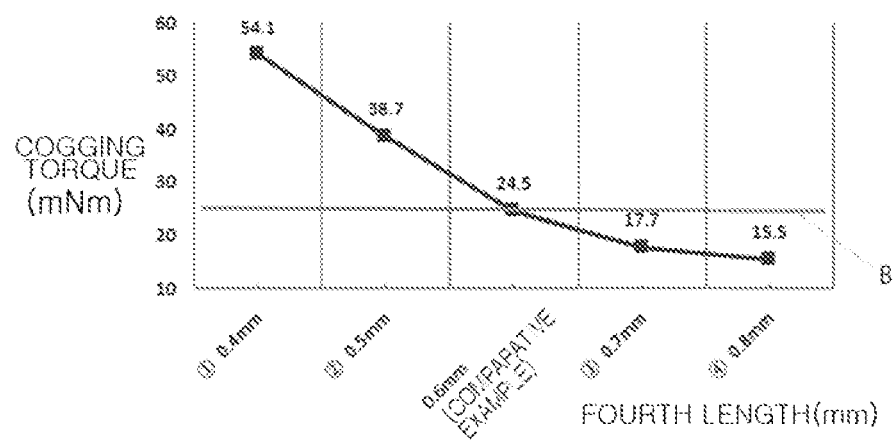

[FIG. 8]

| THIRD LENGTH(L3) | COGGING TORQUE | CHANGE RATIO OF COGGING TORQUE COMPARED TO COMPARATIVE EXAMPLE | TORQUE | CHANGE RATIO OF TORQUE COMPARED TO COMPARATIVE EXAMPLE |
|---|---|---|---|---|
| ① 0.4mm | 54.1 | 121% ↑ | 5.59 | 5% ↑ |
| ② 0.5mm | 38.7 | 58% ↑ | 5.46 | 2% ↑ |
| 0.6mm(COMPARATIVE EXAMPLE) | 24.5 | - | 5.33 | - |
| ③ 0.7mm | 17.7 | 28% ↓ | 5.21 | 2% ↓ |
| ④ 0.8mm | 15.5 | 37% ↓ | 5.07 | 5% ↓ |

[FIG. 9]
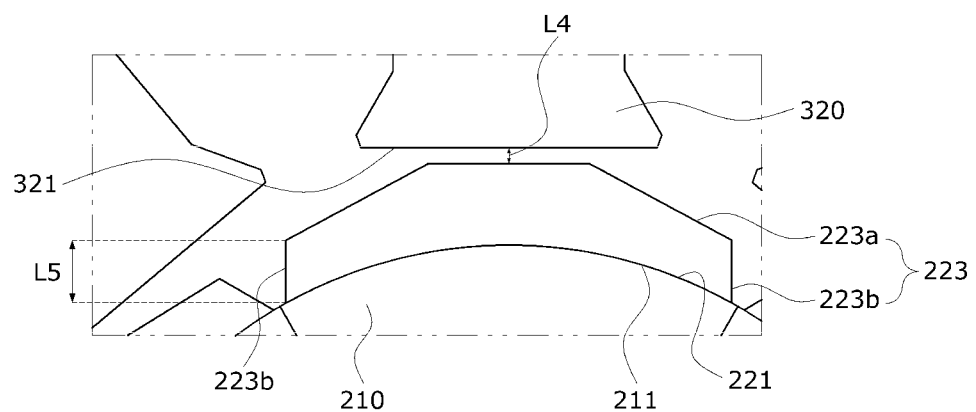

[FIG. 10]
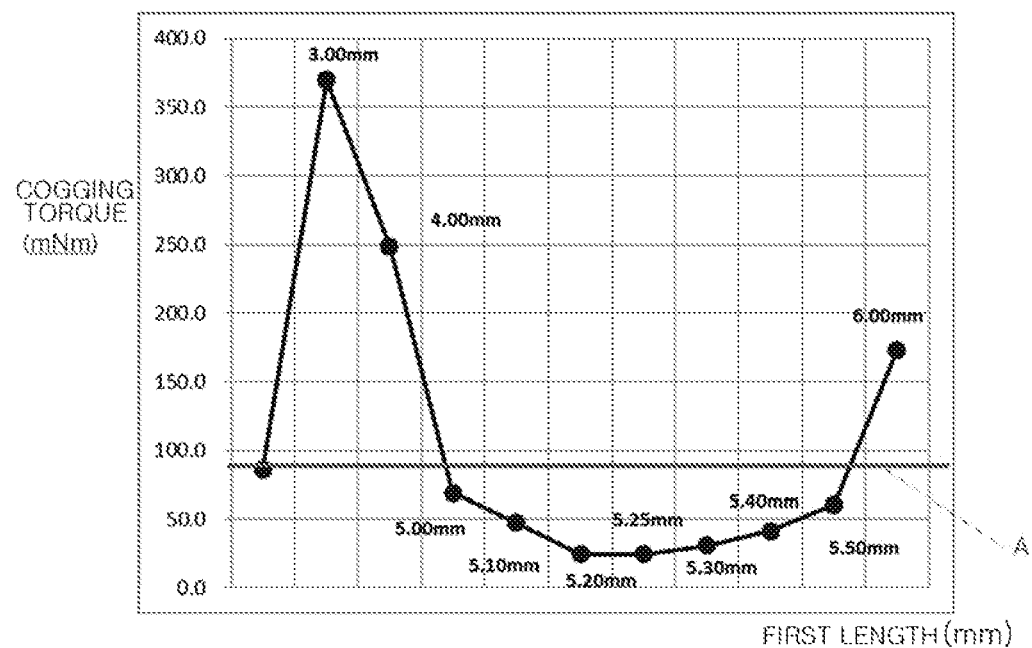

[FIG. 11]

| L5.25mm FIXED | COGGING TORQUE | CHANGE RATIO OF COGGING TORQUE COMPARED TO COMPARATIVE EXAMPLE | TORQUE | CHANGE RATIO OF TORQUE COMPARED TO COMPARATIVE EXAMPLE |
|---|---|---|---|---|
| ① 2.34mm | 26.2 | 7.0% ↑ | 5.34 | 0.19% ↑ |
| ② 2.33mm | 25.5 | 4.1% ↑ | 5.33 | 0% |
| COMPARATIVE EXAMPLE 2.32mm(C) | 24.5 | - | 5.33 | - |
| ③ 2.31mm | 24.2 | 1.2% ↑ | 5.32 | 0.19% ↓ |
| ④ 2.30mm | 24.1 | 1.6% ↑ | 5.32 | 0.19% ↓ |
| ⑤ 2.29mm | 23.4 | 4.4% ↑ | 5.31 | 0.38% ↓ |
| ⑥ 2.28mm | 23 | 6.1% ↑ | 5.31 | 0.38% ↓ |
| ⑦ 2.27mm | 23.1 | 5.7% ↑ | 5.3 | 0.56% ↓ |
| ⑧ 2.26mm | 23.7 | 3.2% ↑ | 5.3 | 0.56% ↓ |
| ⑨ 2.25mm | 24.3 | 0.8% ↑ | 5.29 | 0.75% ↓ |
| ⑩ 2.24mm | 24.8 | 1.3% ↑ | 5.29 | 0.75% ↓ |

[FIG. 12]
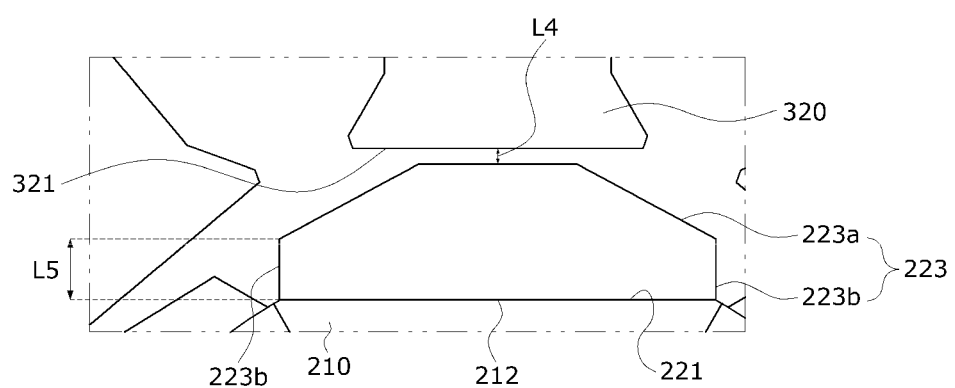

[FIG. 13]

| | COGGING TORQUE | CHANGE RATIO OF COGGING TORQUE COMPARED TO COMPARATIVE EXAMPLE | TORQUE | CHANGE RATIO OF TORQUE COMPARED TO COMPARATIVE EXAMPLE |
|---|---|---|---|---|
| COMPARATIVE EXAMPLE 2.32mm(C) | 24.5 | - | 5.33 | |
| ① L5 2.28mm | 23.0 | 6.1% ↓ | 5.31 | 0.10% ↓ |
| ② L5 2.28mm+BREAD TYPE | 47.8 | 95.2% ↑ | 5.86 | 9.9% ↑ |

MOTOR

CROSS REFERENCE TO RELATED APPLICATIONS

This application is the National Phase of PCT International Application No. PCT/KR2020/011366, filed on Aug. 26, 2020, which claims priority under 35 U.S.C. 119(a) to Patent Application No. 10-2019-0108914, filed in the Republic of Korea on Sep. 3, 2019, all of which are hereby expressly incorporated by reference into the present application.

TECHNICAL FIELD

The present invention relates to a motor.

BACKGROUND ART

A motor includes a stator and a rotor. The stator may include teeth forming a plurality of slots, and the rotor may include a plurality of magnets facing the teeth. The adjacent teeth are disposed apart from each other to form open slots. In this case, a cogging torque may be generated due to a difference in magnetic permeability between the stator formed of a metal material and the open slot which is an empty space when the rotor rotates.

DISCLOSURE

Technical Problem

The present invention is directed to providing a motor allowing a cogging torque to be reduced.

Objectives that have to be solved according to the embodiments are not limited to the above-described objectives, and other objectives which are not described above will be clearly understood by those skilled in the art from the following specification.

Technical Solution

One aspect of the present invention provides a motor including a rotor and a stator disposed to correspond to the rotor, wherein the rotor includes a rotor core and a magnet disposed on the rotor core, a tooth of the stator includes a first surface facing the magnet, the magnet includes a second surface in contact with the rotor core and a third surface which is spaced apart from the second surface and faces the first surface, the third surface includes a flat surface, and a first length which is a shortest distance of the flat surface is in the range of 46% to 50% of a second length of a shortest distance of the first surface.

The first length may be in the range of 47.2% to 47.8% of the second length.

Another aspect of the present invention provides a motor including a rotor and a stator disposed to correspond to the rotor, wherein the rotor includes a rotor core and a magnet disposed on the rotor core, the stator includes yokes and a plurality of teeth protruding from an inner circumferential surface of the yokes, the teeth includes a first surface facing the magnet, the magnet includes a second surface in contact with the rotor core and a third surface which is spaced apart from the second surface and faces the first surface, the third surface includes a flat surface, and a first length which is a shortest distance of the flat surface is in the range of 133% to 146% of a third length which is a shortest distance between a tooth and an adjacent tooth among the plurality of teeth.

The first length (L1) may be in the range of 136.8% to 138.2% of the third length (L3).

The second surface may be a curved surface.

A fourth length which is a shortest distance between the third surface and the tooth of the stator may be in the range of 11.5% to 15% of the first length.

the magnet may include a fourth surface connecting the second surface and the third surface, and the fourth surface may include a flat surface.

The fourth surface may include a first fourth surface connected to the third surface and a second fourth surface connecting the first fourth surface and the second surface, and the first fourth surface may be connected to the second fourth surface to form an angle therebetween.

A fifth length which is a shortest distance of the second fourth surface may be in the range of 42% to 48% of the first length.

The fifth length may be in the range of 43.2% to 43.6% of the first length.

Advantageous Effects

According to an embodiment, an advantageous effect of significantly reducing a cogging torque is provided.

An advantageous effect of reducing vibration of a motor is provided.

DESCRIPTION OF DRAWINGS

FIG. 1 is a view illustrating a motor according to an embodiment.

FIG. 2 is a view illustrating a stator and a rotor.

FIG. 3 is a view illustrating a rotor core and a magnet.

FIG. 4 is a graph showing a cogging torque corresponding to a first length.

FIG. 5 is a table showing the cogging torque corresponding to the first length.

FIG. 6 is a view illustrating a fourth length between a tooth and the magnet.

FIG. 7 is a graph showing a cogging torque corresponding to the fourth length.

FIG. 8 is a table showing the cogging torque corresponding to the fourth length.

FIG. 9 is a view illustrating the rotor core and the magnet for showing a fifth length.

FIG. 10 is a graph showing a cogging torque corresponding to the fifth length.

FIG. 11 is a table showing the cogging torque corresponding to the fifth length.

FIG. 12 is a view illustrating a bread type magnet and a rotor core.

FIG. 13 is a table showing a cogging torque and a torque in the bread type magnet.

MODES OF THE INVENTION

FIG. 1 is a view illustrating a motor 1 according to an embodiment.

Referring to FIG. 1, the motor 1 according to the embodiment 1 may include a shaft 100, a rotor 200, a stator 300, a housing 400, a busbar 500, a sensing unit 600, and a substrate 700. Hereinafter, the term "inward" refers to a direction from the housing 400 toward the shaft 100 which is a center of the motor, and the term "outward" refers to a direction opposite to "inward," that is, the direction from the shaft 100 toward the housing 400.

The shaft 100 may be coupled to the rotor 200. When an electromagnetic interaction occurs between the rotor 200 and the stator 300 due to the supply of a current, the rotor 200 rotates, and the shaft 100 rotates in conjunction with the rotor 200. The shaft 100 is rotatably supported by bearings 10. The shaft 100 may be connected to a vehicle's steering system, and power may be transmitted to the vehicle's steering system through the shaft 100.

The rotor 200 rotates through an electrical interaction with the stator 300. The rotor 200 may be disposed inside the stator 300. The rotor 200 may include a rotor core 210 (see FIG. 2) and magnets 220 (see FIG. 2) disposed on the rotor core 210. In this case, the rotor 200 may be a surface permanent magnet (SPM) type rotor in which the magnets 220 are disposed on an outer circumferential surface of the rotor core 210.

The stator 300 is disposed outside the rotor 200. The stator 300 may include a stator core 300A, coils 300B, and an insulator 300C installed on the stator core 300A. The coils 300B may be wound around the insulator 300C. The insulator 300C is disposed between the coils 300B and the stator core 300A to electrically insulate the stator core 300A from the coils 300B. The coils 300B induce an electrical interaction with the magnets 220 (see FIG. 2) of the rotor 200.

The busbar 500 is disposed on an upper side of the stator 300. The busbar 500 includes a busbar holder (not shown) formed of an insulating material and a plurality of terminals (not shown) coupled to the busbar holder. In this case, the busbar holder is formed of the insulating material to prevent the plurality of terminals from being connected to each other. In addition, the plurality of terminals serve to connect the coils 300B wound around the stator core 300A to allow a current to be applied to the coils.

The sensing unit 600 may be coupled to the shaft 100. The sensing unit 600 includes a sensing plate (not shown) and a sensing magnet (not shown) disposed on the sensing plate.

A sensor which detects a magnetic force of the sensing magnet (not shown) may be disposed on the substrate 700. In this case, the sensor may be a Hall integrated circuit (IC) and serve to detect a magnetic flux of the sensing magnet of the sensing unit 600 coupled to the shaft 100. The sensing unit 600 and the substrate 700 serve to detect a position of the rotor 200 by detecting the magnetic flux changed according to rotation.

FIG. 2 is a view illustrating the stator 300 and the rotor 200.

Referring to FIG. 2, the stator core 300A may include yokes 310 and teeth 320. The teeth 320 may protrude from inner circumferential surfaces of the yokes 310. The teeth 320 may be provided as a plurality of teeth 320. The number of teeth 320 may be variously changed to correspond to the number of magnets 220. The stator core 300A may be formed by combining a plurality of divided cores including the yokes 310 and the teeth 320.

FIG. 3 is a view illustrating the rotor core 210 and the magnet 220.

Referring to FIGS. 2 and 3, hereinafter, any one surface of the teeth 320 facing the magnet 220 is referred to as a first surface 321.

In the motor 1 according to the embodiment, a shape of the magnet 220 may be changed to reduce a cogging torque. The magnet 220 may include a second surface 221, a third surface 222, and fourth surfaces 223. The second surface 221 is a surface in contact with the rotor core 210, and the third surface 222 and the fourth surfaces 223 are surfaces which are not in contact with the rotor core 210.

The second surface 221 may be a curved surface corresponding to an outer circumferential surface 211 of the rotor core 210.

The third surface 222 is disposed apart from the second surface 221 in a radial direction. The third surface 222 is disposed to face the first surface 321. The third surface 222 may be a flat surface. When seen in an axial direction, the third surface 222 may be seen as a straight line.

The fourth surfaces 223 connect both sides of the third surface 222 to the second surface 221. The fourth surfaces 223 may be flat surfaces. The fourth surfaces 223 may be disposed to form angles with respect to the third surface 222 and, along with the third surface 222, form corners disposed in the axial direction. When seen in the axial direction, the fourth surfaces 223 can be seen as straight lines. The fourth surfaces 223 may include a first fourth surface 223a and a second fourth surface 223b. The first fourth surface 223a is connected to the third surface 222. The second fourth surface 223b is connected to the first fourth surface 223a and the second surface 221. The second fourth surface 223b may be disposed to form an angle with respect to the first fourth surface 223a and, along with the first fourth surface 223a, form a corner disposed in the axial direction.

FIG. 4 is a graph showing a cogging torque corresponding to a first length L1, and FIG. 5 is a table showing the cogging torque corresponding to the first length L1.

Hereinafter, the first length L1 corresponds to a straight length of the third surface 222 when seen in the axial direction. A second length L2 corresponds to a straight length from one side edge of the first surface 321 to the other side edge when seen in the axial direction. In addition, a third length L3 may be a straight distance between the first surface 321 and an adjacent first surface 321 when seen in the axial direction.

Referring to FIGS. 4 and 5, line A of FIG. 4 shows a cogging torque of Comparative Example.

Comparative Example corresponds to a motor including a magnet of which an outer surface facing a tooth is a curved surface. As in line A of FIG. 4, a cogging torque of the case of Comparative Example is 86.4 mNm. In this case, a torque of Comparative Example is 5.39 Nm.

The first length L1 is in the range of 46% to 50% of the second length L2. More preferably, the first length L1 is in the range of 47.2% to 47.8% of the second length L2. In addition, the first length L1 is in the range of 133% to 146% of the third length L3. More preferably, the first length L1 is in the range of 136.8% to 138.2% of the third length L3. In these conditions, a cogging torque of Example is lower than the cogging torque of Comparative Example.

Specifically, in conditions in which the second length L2 is 11 mm, and the third length L3 3.8 mm, in cogging torques corresponding to the first length L1, it can be seen that in a section in which the first length L1 increases to 3.0 mm, the cogging torque of Example is greater than the cogging torque of Comparative Example, and as the first length L1 increases, the cogging torque also increases. It can be seen that in a section in which the first length L1 increases from 3.0 mm to 4.0 mm, as the first length L1 increases, the cogging torque is also reduced but is still much greater than the cogging torque of Comparative Example.

For example, when the first length L1 is 3.0 mm, the cogging torque is 369.5 mNm, and an increase ratio of the cogging torque to the cogging torque of Comparative Example is 327%, showing that the cogging torque increases greatly when compared to Comparative Example. In addition, when the first length L1 is 4.0 mm, the cogging torque is 249.3 mNm, and the increase ratio of the cogging torque to the cogging torque of Comparative Example is 188%, showing that the cogging torque increases.

Conversely, when the first length L1 is in the range of 5.0 mm to 5.5 mm (section P), it can be seen that the cogging torque of the motor according to the embodiment is lower than the cogging torque of Comparative Example.

Particularly, when the first length L1 is 5.25 mm, the cogging torque is 24.5 mNm, and a reduction ratio of the cogging torque to the cogging torque of Comparative Example is 72%, showing that the cogging torque is reduced greatly.

In this case, the torque is 5.33 Nm, and the reduction ratio of the torque to the torque of Comparative Example is 0.08%, showing that the reduction ratio of the torque is insignificant. Even in section P (in which the first length L1 is in the range of 5.0 mm to 5.5 mm), the reduction ratio of the torque is in the range of 0.02% to 0.115%, showing that the torque is not reduced greatly even when the cogging torque is reduced greatly.

Meanwhile, for example, when the first length L1 is 6.0 mm, it can be seen that the cogging torque of the motor according to the embodiment becomes higher than the cogging torque of Comparative Example. When the first length L1 is 6.0 mm, the cogging torque is 173.4 mNm, and the increase ratio of the cogging torque to the cogging torque of Comparative Example is 100%, showing that the cogging torque increases.

FIG. 6 is a view illustrating a fourth length L4 between the teeth 320 and the magnet 220, FIG. 7 is a graph showing a cogging torque corresponding to the fourth length L4, and FIG. 8 is a table showing the cogging torque corresponding to the fourth length L4.

The fourth length L4 is a shortest distance between the third surface 222 and the teeth 320 of the stator 300.

When the first length L1 is 5.25 mm, it is seen that the reduction ratio of the cogging torque is highest. Accordingly, the cogging torque corresponding to the fourth length L4 will be described on the basis of the first length L1 of 5.25 mm.

Referring to FIGS. 6 to 8, Comparative Example corresponds to a motor in which the first length L1 is 5.25 mm, a second length L2 is 11 mm, a third length L3 is 3.8 mm, and the fourth length L4 is 0.6 mm. In this case, a cogging torque of Comparative Example is 24.5 mNm. In addition, a torque is 5.33 Nm.

When the fourth length L4 is in the range of 0.7 mm to 0.8 mm, it can be seen that a cogging torque of Example is lower than the cogging torque of Comparative Example.

Specifically, in conditions in which the first length L1 is 5.25 mm, the second length L2 is 11 mm, and the third length L3 is 3.8 mm, in cogging torques corresponding to the fourth length L4, it can be seen that in a section in which the fourth length L4 decreases from 0.6 mm, the cogging torque of Example is higher than the cogging torque of Comparative Example represented by line B of FIG. 7, and as the fourth length L4 increases, the cogging torque is also reduced.

Conversely, when the fourth length L4 is in the range of 0.7 mm to 0.8 mm, it can be seen that the cogging torque of the motor according to the embodiment is lower than the cogging torque of Comparative Example.

For example, when the fourth length L4 is 0.7 mm, the cogging torque is 17.7 mNm, and the reduction ratio of the cogging torque to the cogging torque of Comparative Example 28%, showing that the cogging torque decreases.

Particularly, when the fourth length L4 is 0.8 mm, the cogging torque is 15.5 mNm, and the reduction ratio of the cogging torque to the cogging torque of Comparative Example is 37%, showing that the cogging torque is reduced greatly.

In this case, the torque is 5.07 Nm, and the reduction ratio of the torque to a torque of Comparative Example is 5%, showing that the reduction ratio of the torque with respect to the reduction ratio of the cogging torque is insignificant.

FIG. 9 is a view illustrating the rotor core 210 and the magnet 220 for showing a fifth length, FIG. 10 is a graph showing a cogging torque corresponding to a fifth length L5, and FIG. 11 is a table showing the cogging torque corresponding to the fifth length L5.

Hereinafter, the fifth length L5 may be a straight length of the second fourth surface 223b when seen in the axial direction.

Comparative Example corresponds to a motor in which a first length L1 is 5.25 mm, a fourth length L4 is 0.6 mm, and a fifth length L5 is 2.32 mm. As shown in a table of FIG. 11, in Comparative Example, a cogging torque is 24.5 mNm. In this case, a torque of Comparative Example is 5.33 Nm.

The fifth length L5 is in the range of 42% to 58% of the first length L1. In this condition, a cogging torque of Example is smaller than the cogging torque of Comparative Example.

Specifically, in conditions in which the first length L1 is 5.25 mm, and the fourth length L4 is 0.6 mm, in cogging torques corresponding to the fifth length L5, it can be seen that in a section in which the fifth length L5 increases from 2.32 mm, the cogging torque of Example is higher than the cogging torque of Comparative Example represented by line C of FIG. 10, and as the fifth length L5 increases, the cogging torque also increases. In a section in which the fifth length L5 decreases from 2.32 mm to 2.28 mm, it can be seen that the cogging torque is also reduced as the fifth length L5 decreases. In a section in which the fifth length L5 decreases from 2.28 mm to 2.25 mm, although it is seen that the cogging torque increases as the fifth length L5 decreases, it can be seen that a value thereof is smaller than that of the cogging torque of Comparative Example.

Particularly, the fifth length L5 is in the range of 43.2% to 43.6% of the first length L1. It can be seen that, when the fifth length L5 is in the range of 2.27 mm 2.29 mm, the cogging torque is reduced when compared to Comparative Example.

When the fifth length L5 is 2.28 mm, a reduction ratio of the cogging torque to the cogging torque of Comparative Example is 6.1%, showing that the cogging torque is reduced greatly.

In this case, the torque 5.1 Nm, and the reduction ratio of the torque to the torque of Comparative Example is 0.38%, showing that the reduction ratio of the torque is small.

FIG. 12 is a view illustrating a bread type magnet 220 and a rotor core 210, and FIG. 13 is a table showing a cogging torque and a torque in the bread type magnet 220.

Referring to FIG. 12, a second surface 221 of the bread type magnet 220 is a flat surface. Accordingly, an outer surface 212 of the rotor core 210 is a flat surface. Referring to FIG. 13, Comparative Example corresponds to a motor in which a first length L1 is 5.25 mm, a fourth length L4 is 0.6 mm, and a fifth length L5 is 2.28 mm and which includes the magnet 220 of which the second surface 221 is a curved surface. When the motor includes the bread type magnet 220, in conditions in which the first length L1 is 5.25 mm, the fourth length L4 is 0.6 mm, and the fifth length L5 is 2.28 mm, although an increase ratio of a cogging torque to a cogging torque of Comparative Example 95.2%, which is a great increase in the cogging torque, there is an advantage in that a torque is increased by 9.9% when compared to a torque of Comparative Example.

In the above-described embodiment, an example of an inner rotor type motor has been described, but the present invention is not limited thereto. The present invention may be applied to an outer rotor type motor. In addition, the present invention may be used in various devices for vehicles or home appliances.

The invention claimed is:

1. A motor comprising:
a rotor; and
a stator disposed to correspond to the rotor,
wherein the rotor includes a rotor core and a magnet disposed on the rotor core,
a tooth of the stator includes a first surface facing the magnet,
the magnet includes a second surface in contact with the rotor core and a third surface which is spaced apart from the second surface and faces the first surface,
the third surface includes a flat surface, and
a first length which is a shortest distance of the flat surface is in the range of 46% to 50% of a second length of a shortest distance of the first surface.

2. The motor of claim 1, wherein the first length is in the range of 47.2% to 47.8% of the second length.

3. A motor comprising:
a rotor; and
a stator disposed to correspond to the rotor,
wherein the rotor includes a rotor core and a magnet disposed on the rotor core,
the stator includes yokes and a plurality of teeth protruding from an inner circumferential surface of the yokes,
the teeth include a first surface facing the magnet,
the magnet includes a second surface in contact with the rotor core and a third surface which is spaced apart from the second surface and faces the first surface,
the third surface includes a flat surface, and
a first length which is a shortest distance of the flat surface is in the range of 133% to 146% of a third length which is a shortest distance between a tooth and an adjacent tooth among the plurality of teeth.

4. The motor of claim 3, wherein the first length is in the range of 136.8% to 138.2% of the third length.

5. The motor of claim 1, wherein the second surface is a curved surface.

6. The motor of claim 5, wherein a fourth length which is a shortest distance between the third surface and the tooth of the stator is in the range of 11.5% to 15% of the first length.

7. The motor of claim 1, wherein:
the magnet includes a fourth surface connecting the second surface and the third surface; and
the fourth surface includes a flat surface.

8. The motor of claim 7, wherein:
the fourth surface includes a first fourth surface connected to the third surface and a second fourth surface connecting the first fourth surface and the second surface; and
the first fourth surface is connected to the second fourth surface to form an angle therebetween.

9. The motor of claim 8, wherein a fifth length which is a shortest distance of the second fourth surface is in the range of 42% to 48% of the first length.

10. The motor of claim 9, wherein the fifth length is in the range of 43.2% to 43.6% of the first length.

11. The motor of claim 3, wherein the second surface is a curved surface.

12. The motor of claim 11, wherein a fourth length which is a shortest distance between the third surface and the tooth of the stator is in the range of 11.5% to 15% of the first length.

13. The motor of claim 3, wherein the magnet includes a fourth surface connecting the second surface and the third surface, and
wherein the fourth surface includes a flat surface.

14. The motor of claim 13, wherein the fourth surface includes a first fourth surface connected to the third surface and a second fourth surface connecting the first fourth surface and the second surface, and
wherein the first fourth surface is connected to the second fourth surface to form an angle therebetween.

15. The motor of claim 14, wherein a fifth length which is a shortest distance of the second fourth surface is in the range of 42% to 48% of the first length.

16. The motor of claim 15, wherein the fifth length is in the range of 43.2% to 43.6% of the first length.

* * * * *